Patented Mar. 21, 1939

2,151,197

UNITED STATES PATENT OFFICE 2,151,197

COMPENSATING SPRING AND ALLOY FOR TIMEPIECES

Frederick P. Flagg, Waltham, Mass., assignor to Waltham Watch Company, Waltham, Mass., a corporation of Massachusetts No Drawing. Application September 12, 1936, Serial No. 100,543

5 Claims. (Cl. 267—1)

This invention relates to springs for controlling the oscillations of balance wheels and equivalent balance elements in watches and other mechanical movements which have a time measuring function. It relates particularly to springs of this nature which, by virtue of the properties of the metallic alloys from which they are made, are capable of compensating for the effects of temperature changes on the associated balance members. It relates further to springs adapted for other uses, and to alloys suitable for the manufacture of such springs. Its object is to provide temperature compensating springs having greater hardness, i. e., a higher elastic limit, than compensating springs heretofore known, and it comprises both the springs which fulfill this object and the new alloy or composition of matter adapted to be made into springs having the desired compensating properties and hardness.

In the following explanation of the characteristics and utility of the invention, I will refer particularly to the objects sought and accomplished by its embodiment in compensating hairsprings for watches, but without intending to limit the protection herein claimed exclusively to such embodiments and uses.

A compensating hairspring is one of which the strength, i. e., modulus of elasticity, varies with changes of temperature in suitable measure to neutralize substantially the effects of temperature on the system which it controls. Its practical value in time pieces is that it permits use of a monometallic balance wheel having a continuous rim in place of the more delicate and expensive compensating balance of which the form is changed with changes of temperature, by the action of its bimetallic divided rim, in such manner as to maintain its rate of oscillation constant under the influence of a hardened and tempered steel hairspring. The monometallic balance expands and contracts with temperature changes so much that its rate of oscillation under control of a spring of uniform strength is considerably altered, and the duty of the compensating hairspring is to apply force of greater or less magnitude with the same temperatures in a measure to neutralize this effect. In other words, the modulus of elasticity of the compensating spring must vary with temperature changes in a definite relation to the change in the moment of inertia of the balance caused by the same temperature changes.

Hairsprings have been heretofore produced, made of alloys of iron and nickel, both with and without admixture of other metals, by which practically satisfactory compensation is secured within the range of temperatures to which watches are liable to be subjected. For purposes of test and comparison, such range is assumed to be from somewhat under 40° F. to somewhat over 90° F. But springs made of exclusively ferro-nickel alloys are too soft to be practicable. They are readily deformed in handling, and when bent or twisted out of the form given them initially are spoiled, for they cannot practicably be reformed. Hence great care is needed in assembling them with balances and mounting them in watch movements initially (and particularly in taking down and reassembling a watch for repairs), to avoid giving a permanent distortion to the spring which will impair the running and time keeping qualities of the watch. Efforts have been made to increase the hardness of compensating springs by the inclusion of other metals with the ferro-nickel alloys, but the results have left much to be desired, and the hardest of the commercial compensating hairsprings heretofore used are much softer than the standard hardened and tempered steel hairsprings. I have produced hairsprings having at the same time satisfactory compensating properties combined with hardness, resistance to permanent distortion equal to and greater than that of such standard steel springs, and sufficient ductility to permit bending at a right angle without breaking.

My improved compensating spring is made from an alloy of iron, nickel, manganese and silicon having preferably the following composition:

| | Percent |
|---|---|
| Nickel | 35.00 |
| Manganese | 3.35 |
| Silicon | 5.39 |
| Iron | The remainder |

Although the foregoing specific composition is the best for the purposes indicated now known to me, nevertheless my claim to protection is to be construed as embracing variations from the proportions there stated, within limits hereinafter indicated.

The elements of the alloy are provided in refined condition and as pure as possible, and in particular are free from carbon. The omission of carbon from the formula and its absence from association as an impurity with any of the ingredients, is an important characteristic of the composition. I have found that carbon is a disturbing element which, if present, introduces unpredictable and variable properties into the springs. By eliminating carbon entirely so far as possible, I have been able to produce an alloy with definite properties which can be duplicated in successive melts.

In making the alloy, the ingredients are melted together in a suitable furnace, preferably an electric furnace. The melt is cast in an ingot of any dimensions suitable for subsequent working. After solidifying, the ingot is annealed in an oxygen-free atmosphere to avoid oxidizing any of the metals. All necessary subsequent annealings in the course of reducing the ingot to wire of the dimensions suitable for hair-springs are also carried out in a substantially oxygen-free atmosphere for the same reasons.

The steps of reducing the ingot by swaging and/or drawing to wire, and rolling the wire into ribbon form of required dimensions and shape are, or may be, performed in any known or other suitable way; the procedure not being a feature of the present invention. It may be noted, however, that the final steps of drawing the wire to its ultimate diameter and rolling the ultimate wire into a flat ribbon are performed at low temperature and without intermediate annealing in order to impart to the ribbon the maximum hardness obtainable by cold working. Lengths of the ribbon suitable for springs of prescribed sizes are cut from the ribbon and coiled into spirals of the prescribed diameter and spacing of coils, and are set by heat treatment, preferably at the lowest temperature and for the shortest time which will give permanence to the coiled formation.

The ribbon stock thus produced has a breaking strength in tension prior to the final heat treatment of substantially or approximately 180 kilograms per square millimeter. It suffers a loss in tensile strength as the result of the heat treatment in setting of between 15% and 16%. This strength following cold working is greater, and the relative loss of strength less, than that of any other compensating spring material of which I have knowledge.

Springs which I have made in accordance with the foregoing formula and procedure have a hardness and resilience, i. e., limit of elasticity, greatly exceeding that of compensating hairsprings heretofore made. The standard of comparison with respect to which this quality of the spring is measured is the hardened and tempered carbon steel hairspring of ordinary use. The best available mode of comparative measurement is the following. The outer end of the spring to be measured is clamped in fixed position on a support and loads of progressively increasing magnitude are hung from the collet secured to the inner end of the spring. Each load after being suspended for a period of between one half minute and one and a half minutes is removed and the position to which the spring returns thereafter is observed through a microscope fitted with hair lines in the ocular. So long as the load applied is insufficient to cause a permanent distortion or set in the spring, the collet returns to the same position each time. The load which first produces a permanent distortion of the spring is thus a measure of its resilience. Such tests applied to hairsprings made from steel of hardness 57 on the Rockwell C scale (which is a grade suitable and usual for such springs) and being of the standard dimensions for 16 size watches, showed that on the average 4.8 grams was the minimum load sufficient to produce a permanent distortion. Like tests on hairsprings of the same dimensions embodying the present invention showed 6 grams as the minimum average load sufficient to cause permanent distortion; an advantage in hardness of 25% over the corresponding steel springs. Nevertheless the springs are ductile enough to be bent without fracture at right angles in the manner needed to attach the inner end of the spring to the collet by which the spring is mounted on the balance staff of a watch.

The springs selected for the foregoing illustrative comparison have standard dimensions, each consisting of a flat ribbon .0072 cm. thick by .026 cm. wide, coiled into a flat spiral of fourteen turns spaced apart from one another by twice the thickness of the ribbon. The relative hardness shown by the foregoing illustrative figures is mainly a property of the alloy and partly a result of the cold working process. Substantially the same properties are possessed by springs of all dimensions made from this alloy by similar cold working steps.

The remarkable hardness of my springs is due to the association of manganese and silicon in the alloy, and to the correct proportions of these elements. If either manganese or silicon is present without the other, the hardness resulting from cold working of the wire is less than in alloys containing both silicon and manganese; and the loss of hardness by the treatment employed in setting the springs is proportionally greater. These elements, and particularly manganese, are found also to have a sensible influence on the temperature compensating properties of the springs. While some variations of the specific proportions hereinbefore given may be made without substantial loss of strength, hardness and compensating properties, any large variations, and the substitution of other metals, produce inferior products. My experience has shown that for attainment of desirable results, the proportions of the component metals should be kept within substantially the following limits:

|  | Per cent |
|---|---|
| Nickel | 34.0–36 |
| Manganese | 2.5– 5 |
| Silicon | 4.0– 6 |
| Combined content of manganese and silicon | 6.5–10 |
| Iron | The remainder |

Hairsprings thus made give excellent temperature compensation with monometallic balances and have such ruggedness that they may be handled by watch makers and repairers, in assembling and taking down watches, without unusual care. Hence the invention makes possible for the first time the employment of monometallic balances and compensating hairsprings in watches of the smallest sizes.

The foregoing description of the invention as embodied in hairsprings for watches is not intended to limit the utility of the invention to watches as distinguished from other time pieces in which hairsprings are used, nor to hairsprings as distinguished from springs for other purposes or other useful articles which may be made from the alloy. All novelty inherent in such springs, other articles, and the alloy itself, is within the scope of the protection herein sought.

What I claim and desire to secure by Letters Patent is.

1. A hairspring for time pieces having temperature compensating properties for a monometallic balance within the range from approximately 40° F. to approximately 90° F., and resistance to permanent deformation substantially as great as a hardened and tempered steel spring of the same dimensions, made from an alloy having substantially the following composition:

| | Per cent |
|---|---|
| Nickel | 35.00 |
| Manganese | 3.35 |
| Silicon | 5.39 |
| Iron | The remainder |

2. A hairspring for time pieces having temperature compensating properties for a monometallic balance within the range from approximately 40° F. to approximately 90° F., made from an alloy consisting of the following ingredients in proportional content between the following limits:—

| | Per cent |
|---|---|
| Nickel | 34.0–36 |
| Manganese | 2.5– 5 |
| Silicon | 4.0– 6 |
| Combined content of manganese and silicon | 6.5–10 |
| Iron | The remainder |

3. A compensating hairspring for time piece escapements composed of an alloy of iron, nickel, manganese and silicon with substantially complete exclusion of all other elements and substances, and in which the proportional content of nickel is in the order of 34%–36%, of manganese 2.5%–5%, and of silicon 4%–6%.

4. A spring having an elastic limit substantially as great as that of spring-tempered carbon steel, and variable modulus of elasticity at different temperatures, made of an alloy consisting of iron, nickel, manganese and silicon and no other element in measurable quantity; in which the content of nickel is from 34% to 36%, that of manganese is from 2.5% to 5%, that of silicon is from 4% to 6%, that of manganese and silicon together is from 6.5% to 10%, and the balance is iron.

5. A spring having an elastic limit substantially as great as that of spring-tempered carbon steel, and variable modulus of elasticity at different temperatures, made of an alloy consisting of iron, nickel, manganese and silicon and no other element in measurable quantity; in which the content of nickel is approximately 35%, that of manganese is approximately 3.35%, that of silicon approximately 5.39%, and the balance is iron.

FREDERICK P. FLAGG.